US006615243B1

(12) United States Patent
Megeid et al.

(10) Patent No.: US 6,615,243 B1
(45) Date of Patent: Sep. 2, 2003

(54) SYSTEM AND METHOD FOR PROGRAMMING AND TRANSMITTING MACROS FOR CONTROLLING AUDIO/ VIDEO DEVICES

(75) Inventors: Magdy Megeid, Zurich (CH); Robert Freudenmann, Zurich (CH)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/283,798

(22) Filed: Apr. 1, 1999

(51) Int. Cl.$^7$ .............................................. G06F 15/16
(52) U.S. Cl. ...................... 709/208; 709/328; 709/209; 709/210; 709/245; 709/106
(58) Field of Search ................................. 709/100, 101, 709/102, 103, 200, 208, 209, 210, 211, 207, 245, 217, 219; 725/80; 711/153

(56) References Cited

U.S. PATENT DOCUMENTS

| 4,780,815 A | * | 10/1988 | Shiota ........................ 711/153 |
| 4,803,613 A | * | 2/1989 | Kametani et al. .............. 700/3 |
| 5,206,937 A | * | 4/1993 | Goto ........................... 709/209 |
| 5,341,166 A | * | 8/1994 | Garr et al. ............. 340/825.72 |
| 5,548,725 A | * | 8/1996 | Tanaka et al. ............... 370/450 |
| 5,629,868 A | * | 5/1997 | Tessier et al. ............... 348/164 |
| 5,699,426 A | * | 12/1997 | Tsukamoto et al. ......... 380/240 |
| 6,038,625 A | * | 3/2000 | Ogino et al. ................ 709/328 |
| 6,085,236 A | * | 7/2000 | Lea ............................ 709/220 |
| 6,133,938 A | * | 10/2000 | James ........................ 709/210 |
| 6,212,327 B1 | * | 4/2001 | Berstis et al. ................. 386/83 |
| 6,237,049 B1 | * | 5/2001 | Ludtke .......................... 710/8 |
| 6,292,283 B1 | * | 9/2001 | Grandbois .................. 348/734 |

* cited by examiner

Primary Examiner—Majid Banankhah
(74) Attorney, Agent, or Firm—Joseph S. Tripoli; Paul P. Kiel

(57) ABSTRACT

A system for programming/controlling various audio/video devices coupled to one another via a bus structure, through the use of a single macro key utilizes an addressing structure. Each various audio/video device includes memory and a processor/controller for the memory and bus management. The memory is divided into master data memory and slave data memory depending on the role of the audio/video device. Data transfer over the bus only contains dummy numbers that are used as macro command addresses, with the macro data itself processed and stored in the various audio/video device. This eliminates the need to store the different commands of the various audio/video devices in the device chosen to initiate the macro. For each macro, one audio/video device is the master device while the remaining audio/video devices are slaves.

19 Claims, 11 Drawing Sheets

SYSTEM AND METHOD FOR PROGRAMMING AND TRANSMITTING MACROS FOR CONTROLLING AUDIO/VIDEO DEVICES

BACKGROUND OF THE INVENTION

1. Field of the Invention

The present invention relates to multi-media systems including television interactive services and, more particularly, to the control of interconnected multi-media systems via macros.

2. Description of the Related Art

What are known as multi-media systems include many types of audio/video (AN) devices such as televisions, DVDs, VCRs, multi-media terminals (set-top boxes or the like), receivers, and the like. These A/V devices can be both digital and analog. These systems are usually coupled to one another generally through a multi-media terminal. New A/V devices may be added from time to time. As a result, the owner or viewer is confronted with a variety of complex and often different controlling functions.

In view of this complex array of devices, there is a need to simplify the task of controlling the devices. One method for control is known as the macro. A macro is a sequence of instructions or commands that is usually invoked with a single key or instruction. User-defined macros allow the user to define the sequence of instructions or commands to be performed such as are common in computer programs such as word processing programs. A macro key is a programmable key that enables the viewer to perform a predefined sequence of commands with one key.

The problem, however, with current user-defined macros is that they pertain to a single device with a computer as well being defined as a single device. What is therefore needed is a way to control the many devices of a multi-media system via a single audio/video or multi-media device or terminal.

SUMMARY OF THE INVENTION

The present invention is a system and method for controlling or programming multiple audio/video or multi-media devices that are in communication with at least one common audio/video device.

In one form, the present invention provides an addressing system for coupled audio/video (A/V) devices based on a master/slave relationship. Such addressing system reduces the amount of transmitted data between the devices.

According to one embodiment, each A/V device, in addition to its normal function, includes memory and processing capabilities necessary to implement code, transmit and receive data over a bus structure, and store various macro instructions. At least one of the A/V device includes macro keys for programming and running a macro which can control the operation of any of the coupled A/V devices.

Since the local command codes for the various A/V devices are different, the present invention provides an addressing scheme wherein dummy numbers or macro command numbers (MCNs) which are used to define every command in a macro, and messages or status words are exchanged on a bus between master and slave A/V devices. When a user first presses the macro key of one of the A/V devices, that A/V device becomes the master A/V device and sends a first macro command number (MCN) on the bus. Depending on which A/V device the user selects for programming, that A/V device becomes a slave A/V device and that A/V device accepts the MCN and sends an acknowledge message to the master A/V device via the bus. The master A/V device recognizes that a slave macro command has been selected by the user, and then generates the next MCN (dummy number) for the next macro command. This can be any A/V device. Upon completion of the steps, the macro key is again pressed. The master A/V device does not use the MCN for its own macro commands, but for the slave A/V devices.

In addition to other features, the present invention provides 1) that local device data is internally processed at high speed by the particular A/V device; 2) that no device addresses are required (which enables the easy addition of additional A/V devices); 3) each A/V device uses its own internal device command codes; and 4) that there is a reduced amount of external transferred data (which compensate for any slow data bus used).

In one form, a connected display device such as a television or monitor, can display the macro commands during programming and/or during the macro run. In this regard, the devices involved in the macro would send the text information about the macro command(s) to the monitor. Thus, every step of the chosen macro would appear on the display device.

BRIEF DESCRIPTION OF THE DRAWINGS

The above-mentioned and other features and advantages of this invention, and the manner of attaining them, will become more apparent and the invention will be better understood by reference to the following description of embodiment(s) of the invention taken in conjunction with the accompanying drawings, wherein.

Corresponding reference characters indicate corresponding parts throughout the several views. The exemplification set out herein illustrates a preferred embodiment of the invention, and such exemplification is not to be construed as limiting the scope of the invention in any manner.

DETAILED DESCRIPTION OF THE INVENTION

Figure 1:
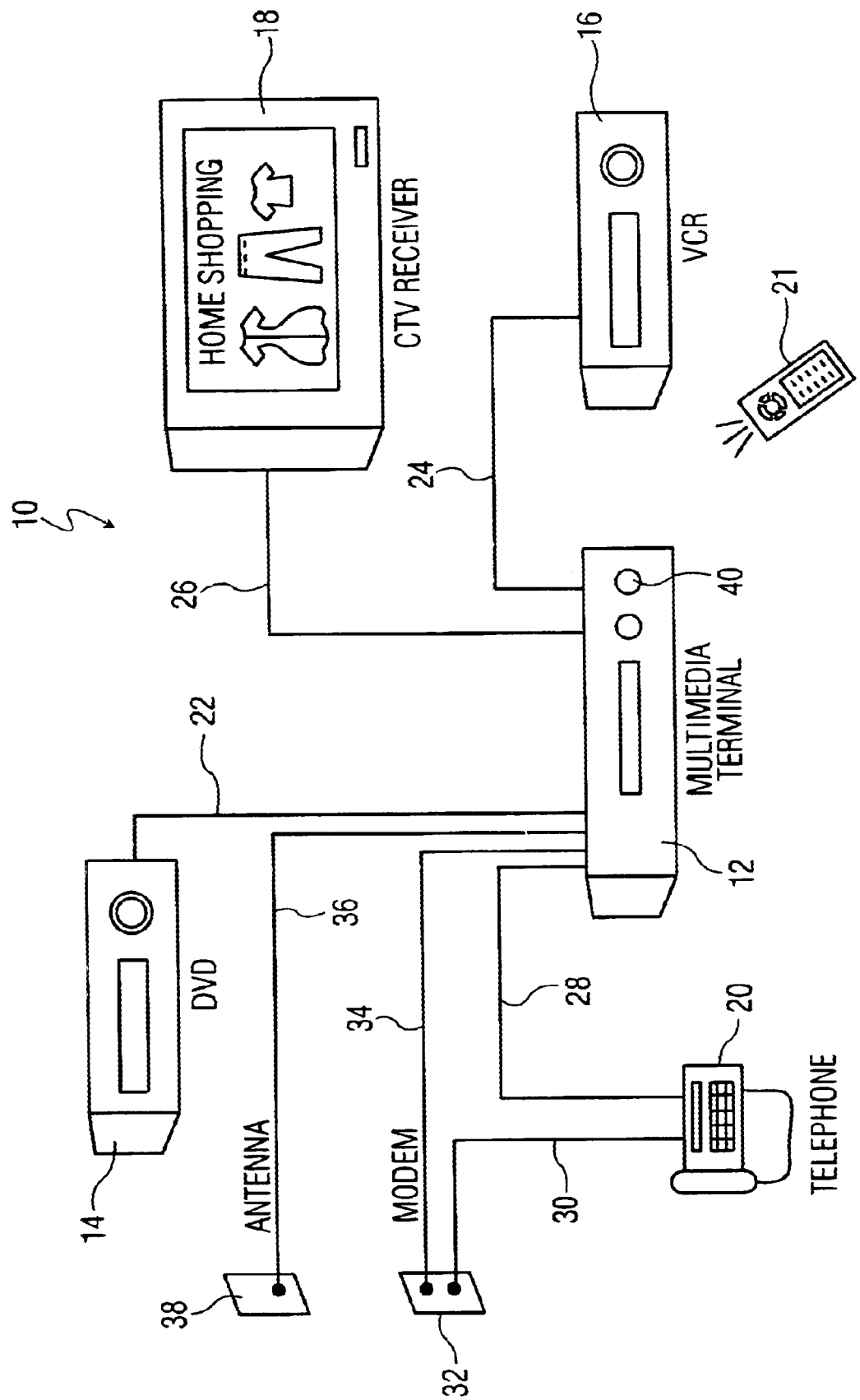
FIG. 1 is a diagrammatic view of an exemplary group of coupled audio/video devices.

Referring now to the drawings and, more particularly to FIG. 1 there is shown a typical multi-media system or group 10 of various multi-media devices including multi-media terminal 12 (which can be a set-top box, a receiver, DSS receiver, other satellite receiver, or any similar type A/V device), digital video disk (DVD) 14, video cassette recorder (VCR) 16, television or monitor 18, and telephone 20. These devices are controllable via remote 21 solely, or in addition to front panel keys and/or buttons on the particular device. Of course, it should be understood that the particular devices or components depicted in FIG. 1 is only representative of the many devices that may be coupled in a multi-media system.

DVD 14 is coupled to multi-media terminal 12 via cable 22 which is representative of a communications bus and A/V input/output. VCR 16 is coupled to multi-media terminal 12 via cable 24 which is representative of a communications bus and A/V input/output. Television 18 is coupled to multimedia terminal 12 via cable 26 which is representative of a communications bus and A/V input/output. Telephone 20 is coupled to multi-media terminal 12 via cable 28 which is representative of a communications bus and A/V input/output. Additionally, telephone 20 is coupled via communications line 30 to communications jack 32 that is representative of being coupled to a usual communications medium. Multi-media terminal 12 also includes an internal modem coupled via modem line 34 to communications jack 32 which allows two-way communications to occur between multi-media terminal 12 and any type of outside device (not shown) such as a computer or the like. Additionally, multi-media terminal 12 includes input/output line 36 that accepts input from an antenna, satellite dish, cable company, or the like represented by jack 38. Line 36 may also allow two-way communications to occur between a cable company or the like.

Cables 22, 24, 26, 28, 34, and 36 allow bi-directional data transfer. Such types of data buses may be SCART, 1394, or other which permits such bi-directional data transfer between multi-media terminal 12 and the various devices.

Figure 10:
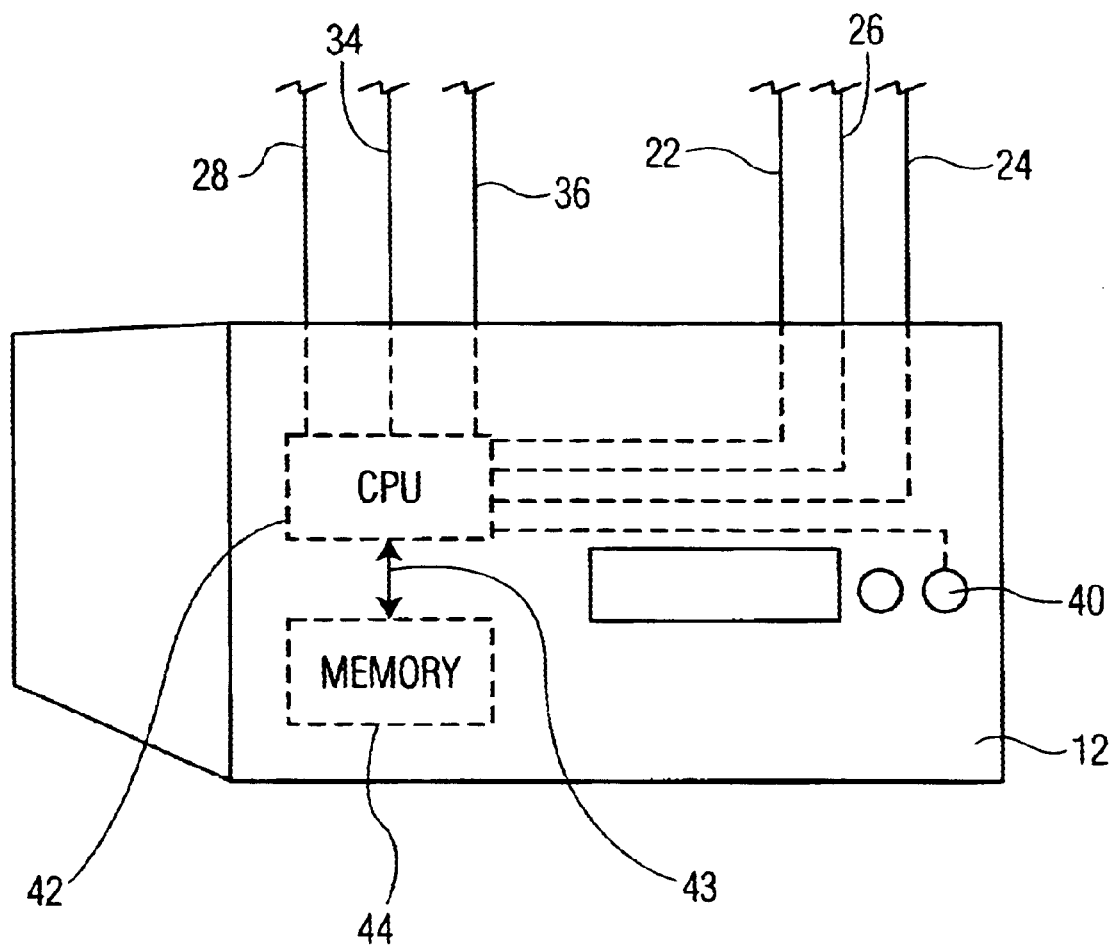
FIG. 10 is an enlarged view of the multi-media terminal of FIG. 1 showing various internal components and connections to the various cables.

Multi-media terminal 12 includes macro key 40 in addition to other typical buttons, display devices, and the like. With additional reference to FIG. 10 macro key 40 is coupled internally to CPU 42 which is in turn coupled to memory 44 via communication line/bus 43. Other typical internal components are not shown. Any or all multi-media devices may include a macro key and thus some type of processor and memory. At a minimum, each multi-media device includes memory and a processor to permit data receipt and transfer. While each device may not have a macro key, and thus may not function as a master device, each device does include the software necessary to implement the present invention. It is assumed that each device includes at a minimum, the memory and processing necessary to store and execute the necessary implementation software as well as the memory configured in the following manner.

Figure 3:
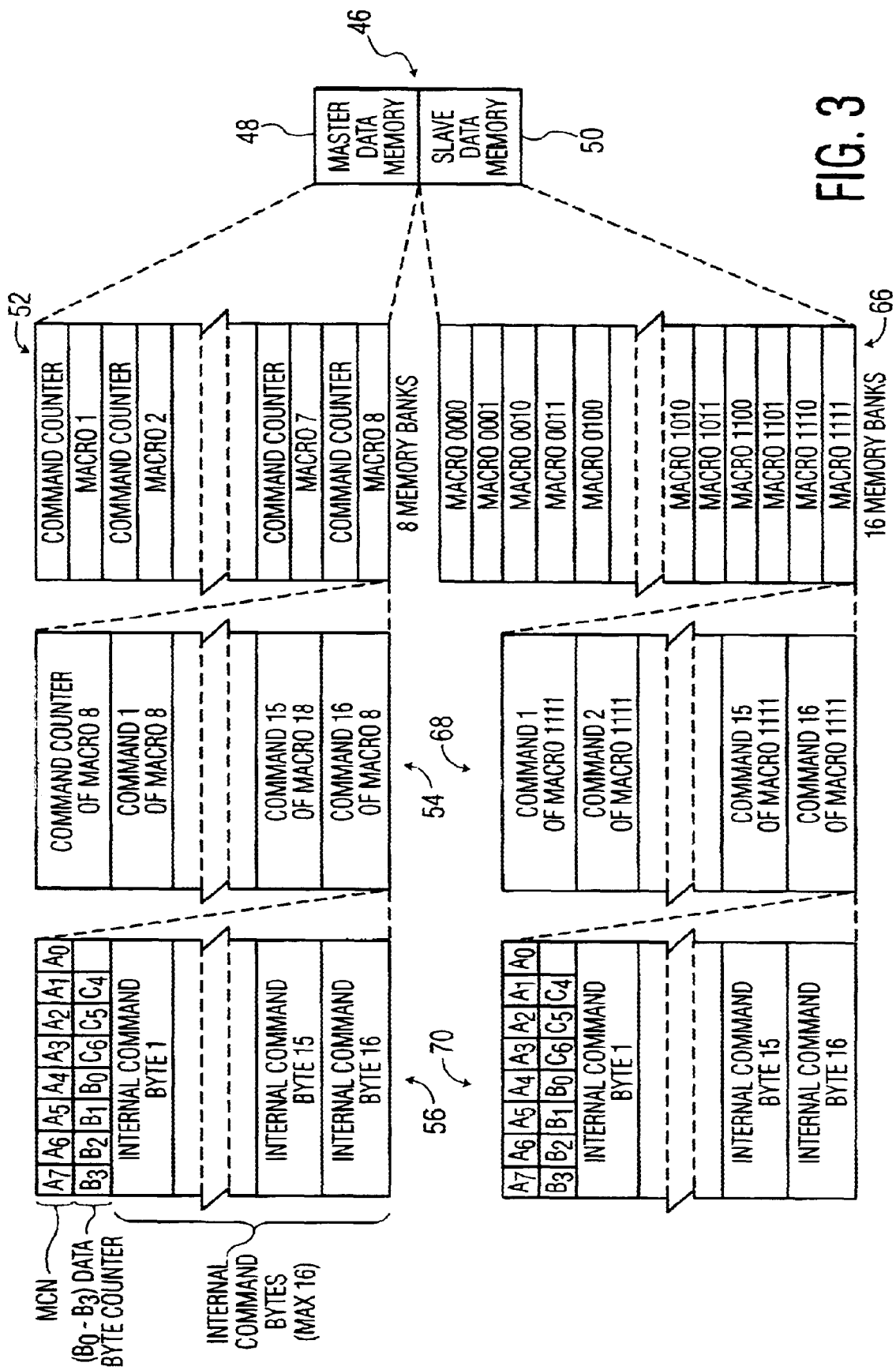
FIG. 3 is a diagrammatic view of a data memory configuration utilized by each A/V device in accordance with the principles of the present invention.

With reference to FIG. 3 the structure of memory within a device is depicted. Memory 46, which can be any type of memory, is divided into master data memory 48 and slave data memory 50. When the device is a master device, master data memory 48 is utilized. When the device is a slave device, slave data memory 50 is utilized. Master data memory 48 is subdivided into a plurality of memory banks 52 with eight (8) such memory banks being shown. It should be understood that eight (8) memory banks is by way of example and not a limitation on the number of memory banks as there could be more or less memory banks. Every memory bank 52 contains a macro, such that with eight (8) memory banks, there can be a total of eight (8) macros that can be stored therein. Each memory bank 52 contains a 4 bit command counter such that there is a maximum of sixteen (16) commands per macro. Thus, each memory bank 52 is further subdivided into command sections 54 of which there are sixteen (16), the total number of command section 54 corresponding to the maximum number of commands per macro. Each command section 54 contains all of the data necessary for retrieving one macro command.

Figure 2:
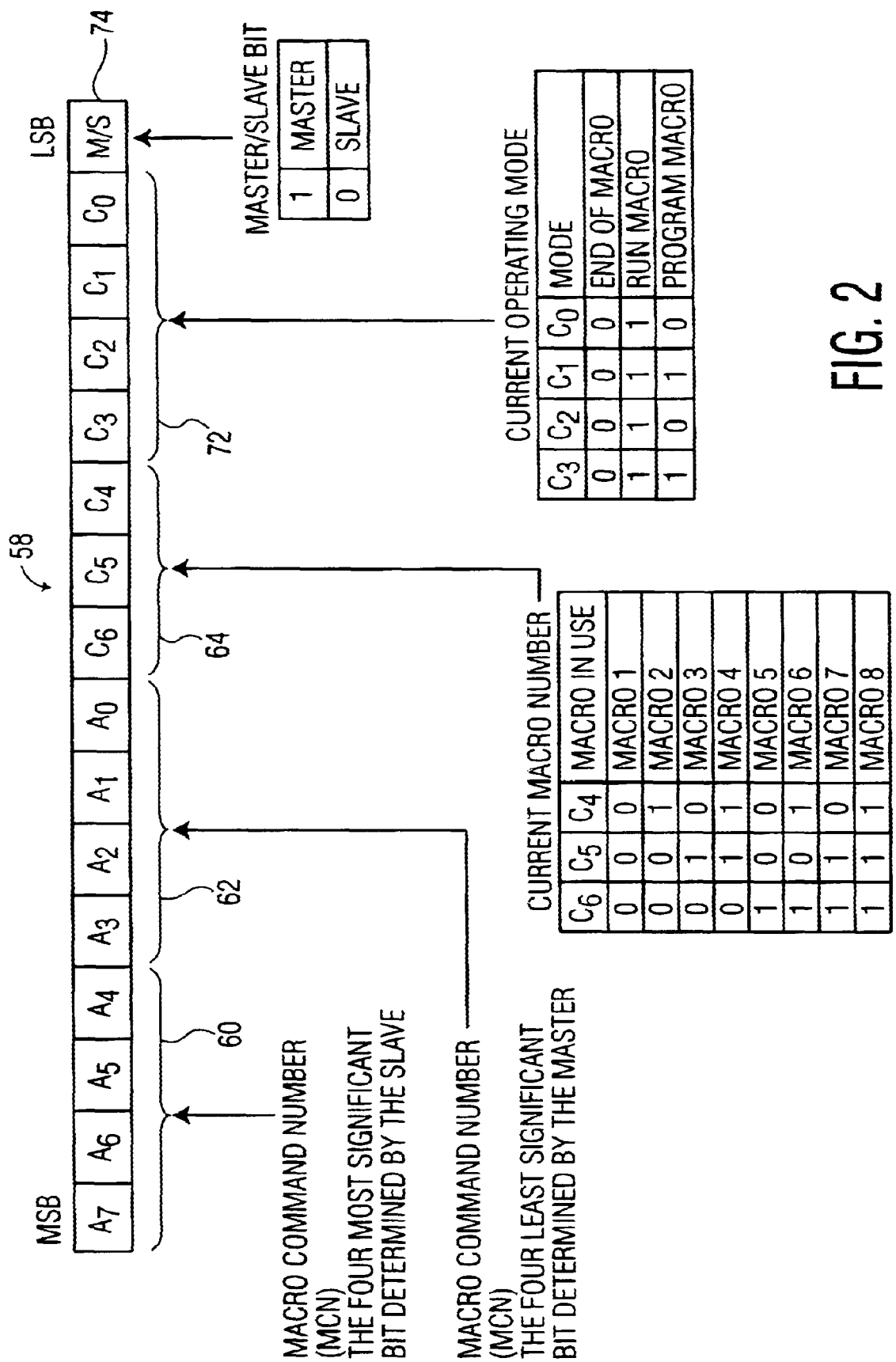
FIG. 2 is a diagrammatic view of a definition of a status word in accordance with the principles of the present invention.

In particular, data area 56 contains an eight bit macro command number (MCN) designated A7, A6, A5, A4, A3, A2, A1, and A0. The most significant bits (MSB) A7, A6, A5, and A4 are determined by the slave device, while the least significant bits (LSB) A3, A2, A1, and A0 are determined by the master device. For safe data handling, the master device only determines the four least significant bits of the MCN while the active slave device only determines the most significant bits. The four (4) most significant bits and the four (4) least significant bits comprise the first byte of the two-byte (or sixteen bit) master status word (MSW). In accordance with an aspect of the present invention, the MSW is the only data that appears on the bus during a macro. With additional reference to FIG. 2, a MSW 58 is depicted which shows the MCN bits A7, A6, A5, A4, A3, A2, A1, and A0. Slave MCN bits 60 (A7, A6, A5, and A4) and master MCN bits 62 (A3, A2, A1, and A0) form the first part of the two-byte MSW 58. Data area 56 also contains a data byte counter comprising four (4) bits B3, B2, B1, and B0, and the current macro number comprising three (3) bits C6, C5, and C4. The current macro number, designated 64 in FIG. 2, indicates the current macro in use. The current macro number table depicted in FIG. 2 shows the assignment of the various combinations of bits to the various macro numbers. The last data contained in data area 56 is the internal command bytes of which there is a maximum of sixteen (16).

The second byte of MSW 58, as depicted in FIG. 2, consists of current macro number 64, comprising bits C6, C5, and C4, current operating mode 72, consisting of bits C3, C2, C1, and C0, and master/slave bit 74. Current operating mode 72 has three (3) valid bit configurations as depicted in the current operating mode table in FIG. 2. As the name suggests, these four (4) bits C3, C2, C1, and C0 indicate the current operating mode which can be 1) end of macro; 2) run macro; and 3) program macro. MSW 58 further includes master/slave bit 74 which is used as an acknowledge message from the slave device to the master device. Master/slave bit 74 is set to logical "1" when coming from the master device, while master/slave bit 74 is set to logical "0" when coming from the slave device. The rest of the status word 58 remains the same. A slave device only considers the status word of the master device and ignores other slave status words on the bus. Thus, when the user depresses the macro key of the selected device it becomes the master device and generates four (4) least significant bits of the first byte, being the macro command number. The slave device determines the four (4) most significant bits of the first byte, being the macro command number.

With reference back to FIG. 3, slave data memory 50, which is only used when a device is configured as a slave in a macro, is divided into memory banks 66. While slave data memory 50 could have a number of banks that is as large as the number of possible slave macros, i.e. five (5) devices times eight (8) macros which results in forty (40) banks, FIG. 3 depicts sixteen (16) memory banks 66 and thus is only exemplary. The sixteen (16) memory banks have select bits 000 to 1111 binary, which are used to select the appropriate memory bank. Each memory bank 66 is divided into command sections 68 wherein there are sixteen (16) commands available for each macro stored in the memory bank 66. Additionally, each command section 68 is further divided into data area 70 which is the same structure as data area 56 of master data memory 48.

Figure 8:
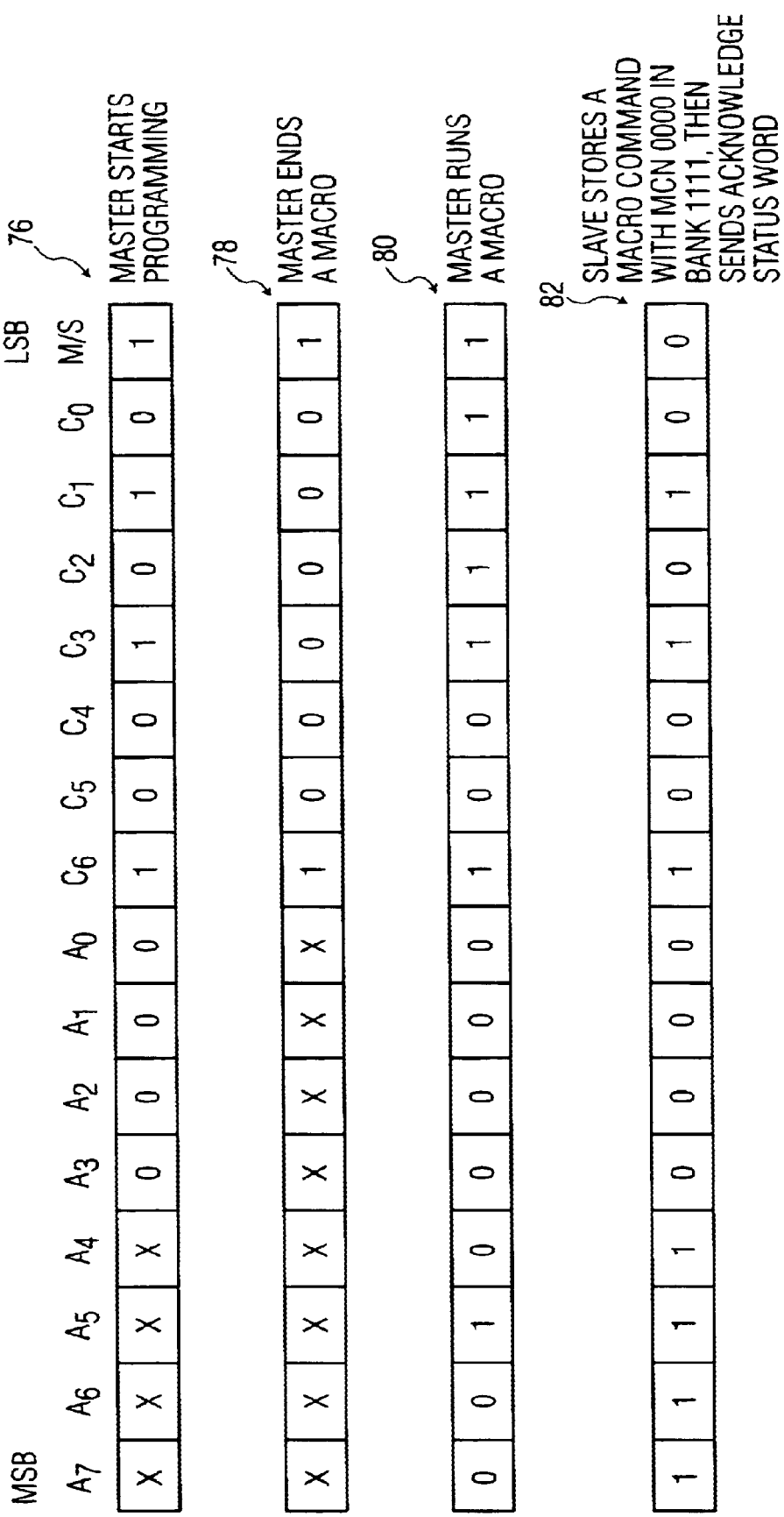
FIG. 8 depicts exemplary status words in accordance with the principles of the present invention.

FIG. 8 depicts four (4) typical status words, labeled 76, 78, 80, and 82. Status word 76 is sent onto the bus connecting the A/V devices by the master A/V device (selected by the user by the pressing of the macro key) at the start of macro programming. Bits A7, A6, A5, and A4 are undetermined since they are selected or determined by the slave device. Bits A3, A2, A1, and A0 are determined by the master device and constitute the macro command number (MCN) here logical "0000". Bits C6, C5, and C4 are the current macro number, here logical "100" being macro "5". Bits C3, C2, C1, and C0 designates the current operating mode from the three (3) valid operating modes, here logical "1010" being the program macro code (see Current Operating Mode table, FIG. 2). The master/slave (M/S) bit is set to logical "1" since the status word 76 is coming from the master device.

Status word 78 is an end the macro word by the master device. Here, since the macro is ending and there will be no more programming, the only bits of significance are C3, C2, C1, and C0, the current operating mode. Per the Current Operating Mode table of FIG. 2, logical "0000" for these bits indicates that the macro is ending. Again, since the word is coming from the master device, the M/S bit is set to logical "1". It should be noted that in this example the current macro number, indicated by bits C6, C5, and C4, is again macro "5" or logical "100".

Status word 80 is a run the macro command by the master device, which is indicated by bits C3, C2, C1, and C0, the Current Operating Mode bits, set to logical "1111". Since it is the master device that is sending this word on the bus, the M/S bit is a logical "1". Here, the macro command number (MCN) bits A7, A6, A5, and A4 set by the slave device is logical "0010" being bank "0010" while the macro command number (MCN) bits A3, A2, A1, and A0 set by the master device is logical "0000" for storing in slave memory bank "0010".

Status word 82 is an acknowledge word during the program mode since the M/S bit is set to logical "0" and bits C3, C2, C1, and C0, the current operating mode bits is logical "1010". Here, the slave device stores macro command number (MCN) logical "0000", bits A3, A2, A1, and A0, in slave memory bank 1111 indicated by bits A7, A6, A5, and A4 set to logical "1111".

It should be understood that the master device is selected by the user by the pressing of the macro key of one of the available A/V devices and this does not change for the programming of the macro. The slave device is variable, depending on the programming selection of the user.

In order to program a macro, a device is selected that has a macro key such as multi-media terminal 12. The device selected, here the multi-media terminal 12, becomes the master device with the remaining devices becoming slave devices. A device can be a master or a slave, with the only constraint being that the master device naturally must have a macro key.

Figure 4:
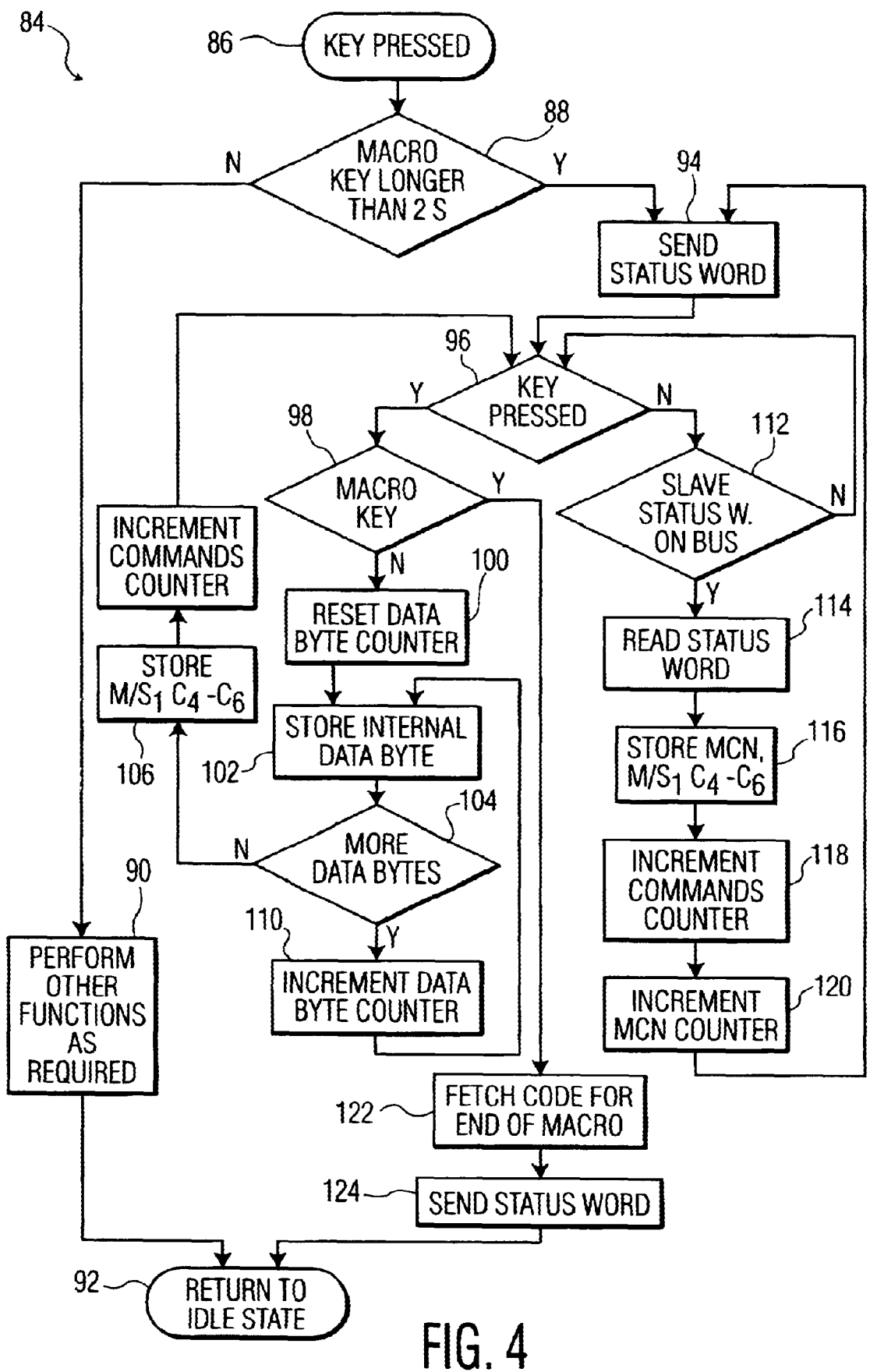
FIG. 4 is a flow chart of the steps performed by a master A/V device in the macro programming mode in accordance with the principles of the present invention.

With reference to FIG. 4, flow chart 84 shows the program flow or steps performed by a master device in the macro programming mode. Initially, a device is selected by the user to program a macro, which is initiated by the pressing of a key 86 which is the macro key of the device. The program determines if the macro key is held for a predetermined period of time 88, here longer than two (2) seconds. If the macro key is not held for more than the predetermined time period, then the device performs any other functions as required 90 and the present program returns to the idle state 92. If the macro key is pressed for more than the predetermined time period, then the device becomes a master device and sends a status word 94 on the bus and the master device awaits for a key to be pressed 96 on a device, which can be itself or another A/V device coupled in the group. If no key is pressed, the program checks to see if a slave status word is on the bus 112. If no such slave status word has been generated by a slave device and thus is not on the bus, the program awaits for a key to be pressed 96. Should a slave status word be present on the bus 112, the slave status word is read 114 and the macro control number (MCN), the master/slave (M/S) bit, and the current macro number bits C4, C5, and C6 are stored 116 in the master memory of the master device. Additionally, the command counter is incremented 118 and the macro control number (MCN) counter is incremented 120.

Thereafter, the master device sends a status word 94 on the bus and then awaits for a key to be pressed 96. If a key is pressed on one of the devices, the program checks to determine if the key pressed is the macro key 98. If the macro key is pressed, this means that the user wants to end the macro. The program fetches the code for the end of macro 122, sends a status word 124 onto the bus indicating that the end of the macro has been reached, and then returns to the idle state 92. However, if the key pressed 96 is not the macro key 98, the data byte counter is reset 100 and internally stored 102 in memory. If more data bytes 104 appear, the data byte counter is incremented 110 and internally stored 102. This loop continues until there are no more data bytes, wherein the master/slave (M/S) bit and the current macro number bits C4, C5, and C6 are stored 106. After storage of the master/slave (M/S) bit and the current macro number bits C4, C5, and C6 106, the command counter is incremented 108, and then the program awaits another key pressed 96.

Figure 5:
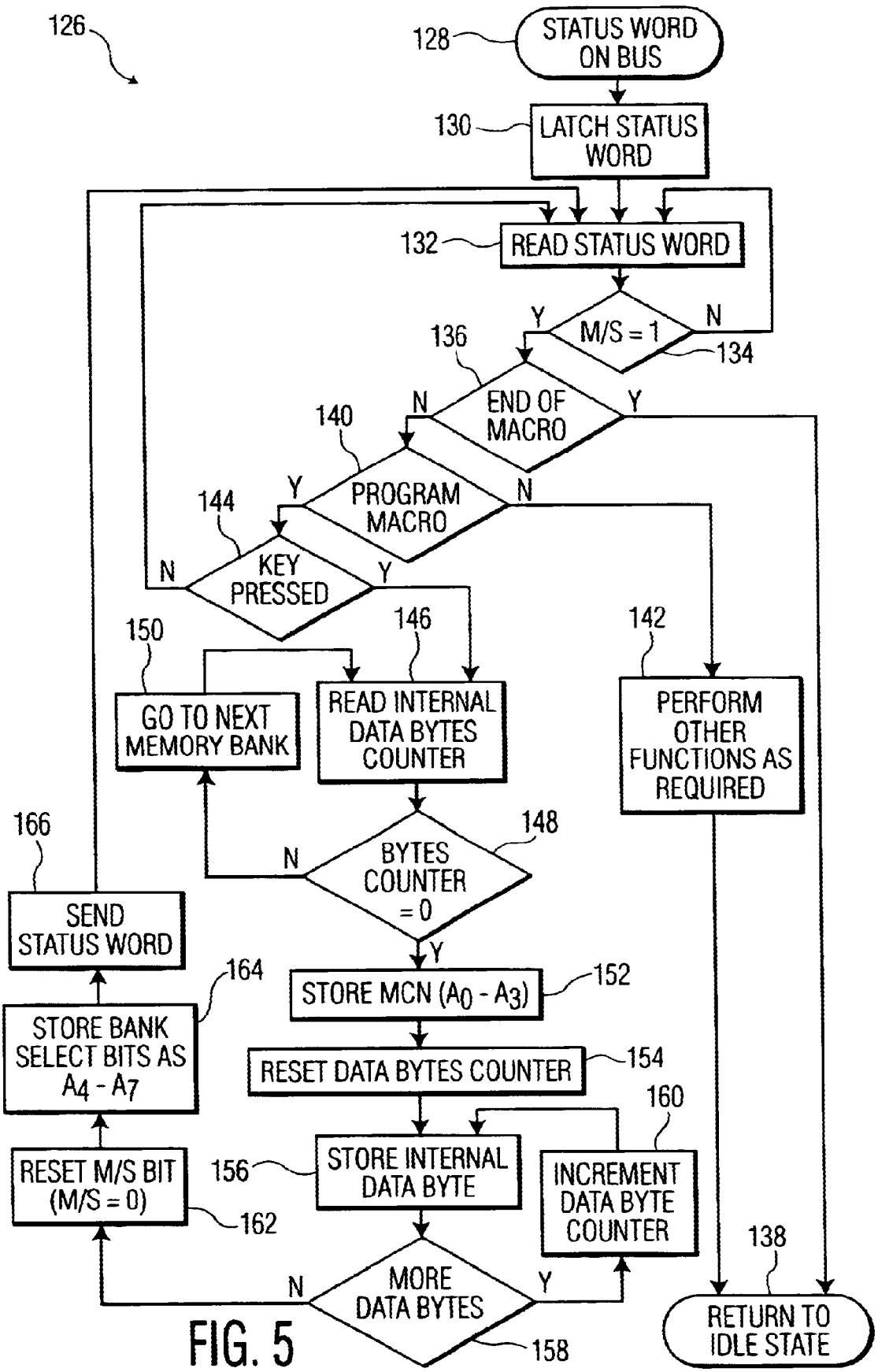
FIG. 5 is a flow chart of the steps performed by a slave A/V device in the macro programming mode in accordance with the principles of the present invention.

With reference now to FIG. 5, there is depicted flow chart 126 showing the program flow or steps performed by a slave device(s) in the macro programming mode. The slave device determines whether there is a status word on the bus 128 as sent by the master device and if so, latches the status word 130. The latched status word is read 132 to determine the setting of the master/slave (M/S) bit 134. If the M/S bit is not set to logical "1", then the program awaits another status word, since an M/S bit set to logical "0" means it was generated by a slave device and should not be accepted. If the M/S bit is set to logical "1" the program determines if the status word signals the end of the macro 136. If the end of the macro is received, the device/program returns to the idle state 138. However, if the end of the macro signal is not received, then the program determines whether the status word/signal is program macro 140.

If the status word is not to program a macro, the device/program performs other function as required 142 and then returns to the idle state 138. If the status word is to program a macro, it is determined whether a key has been pressed 144. No key pressed returns the program to read status word 132. If a key has been pressed the device reads the internal data bytes counter 146. When the bytes counter is not equal to zero (0) the next memory bank is reviewed 150 and then read 146. When the bytes counter is equal to zero (0) the macro command number, bits A0, A1, A2, and A3 are stored 152, the data bytes counter is reset 154, and the internal data byte is stored 156. Thereafter, it is determined whether there are more data bytes 158. If there are more data bytes, the data bytes counter is incremented 160 then stored 156. If there are no more data bytes, the master/slave (M/S) bit is set to zero (0) 162, the bank select bits are stored as A4, A5, A6, and A7 164, and the slave sends a status word 166 onto the bus. Thereafter, the program waits for another status word on the bus.

Figure 6:
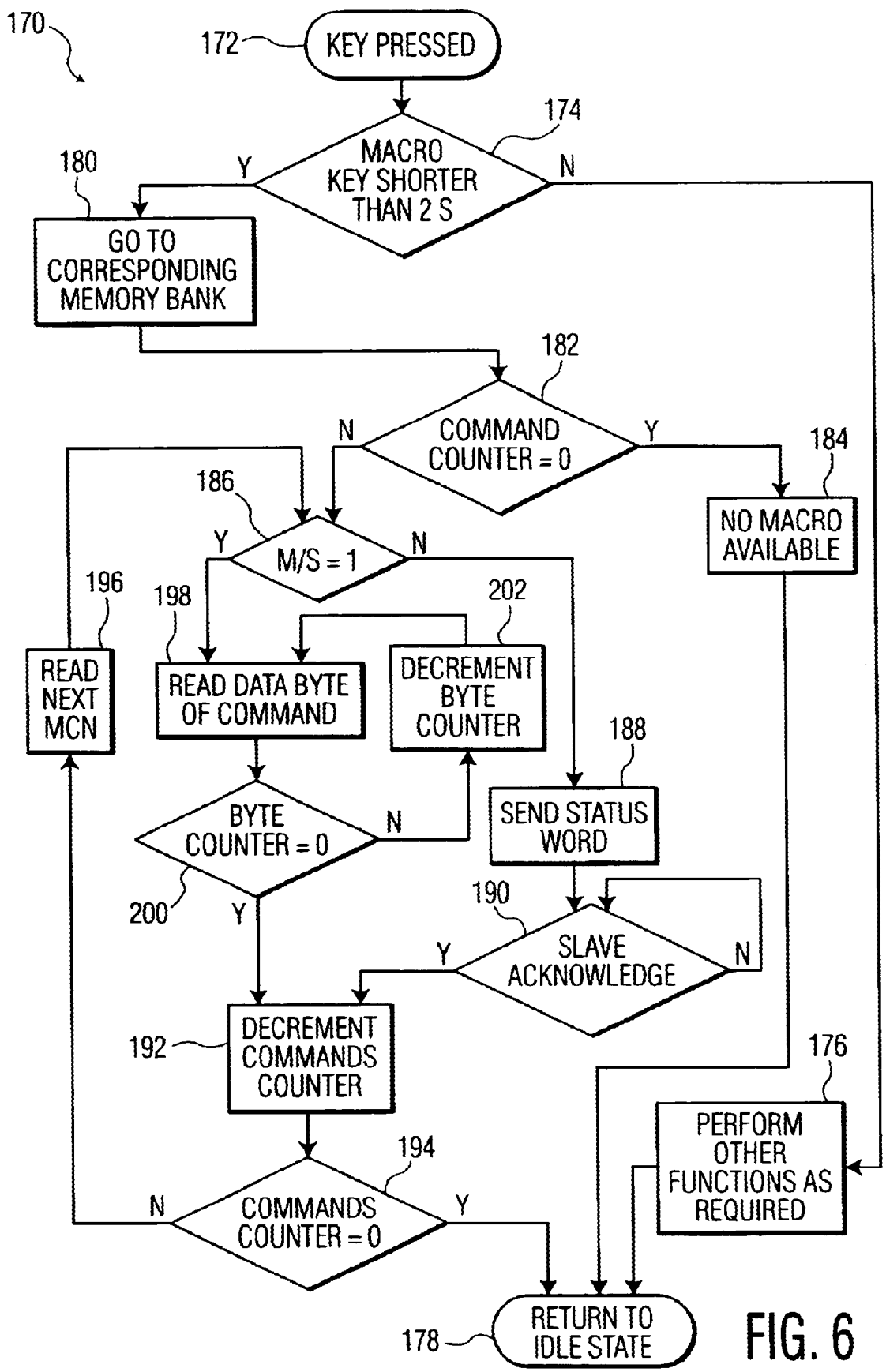
FIG. 6 is a flow chart of the steps performed by a master A/V device in the macro run mode in accordance with the principles of the present invention.

With reference now to FIG. 6, there is depicted flow chart 170 showing the program flow or steps performed by the master device during the macro run mode. Initially, a device waits to see if a key has been pressed 172. If a key press has been detected, and it is the macro key, the program determines if the macro key has been depressed for less than a predetermined time period, in this case two (2) seconds. When the macro key has been pressed for longer than two (2) seconds, the device performs other functions as required 176 then returns to the idle state 178. If the macro key has been pressed for a time period shorter than the predetermined time period, the program goes to the corresponding memory bank 180 and the command counter is checked. When the command counter is equal to zero (0), there is no macro available 184 and the device returns to the idle state 178. If, however, the command counter is not equal to zero (0), the master/slave (M/S) bit is checked to determine if it is set to logical "1" 186, and if not, a status word is sent 188 on the bus. Thereafter, the master device awaits a slave acknowledge 190 and loops until the slave does acknowledge.

When the slave does acknowledge, the commands counter is decremented 192, and then checked to determined if the command counter is equal to zero (0) 194. When the command counter is equal to zero the device returns to the idle state 178. When the command counter is not equal to zero, the next macro control number is read 196 and then loops to determine if the master/slave (M/S) bit of the next macro control number is set to logical "1" 186. If the master/slave (M/S) bit is set to logical "1" the command data byte is read 198 and the byte counter is checked to determine if the byte counter is zero (0). When the byte counter is not equal to zero (0), the byte counter is decremented 202 and then the command data byte is read 198. When the byte counter is equal to zero (0), the commands counter is decremented 192 and then checked to determined if the command counter is equal to zero 194. As above, when the commands counter is then equal to zero (0), the device returns to the idle state 178, else the next macro control number 196 is read.

Figure 7:
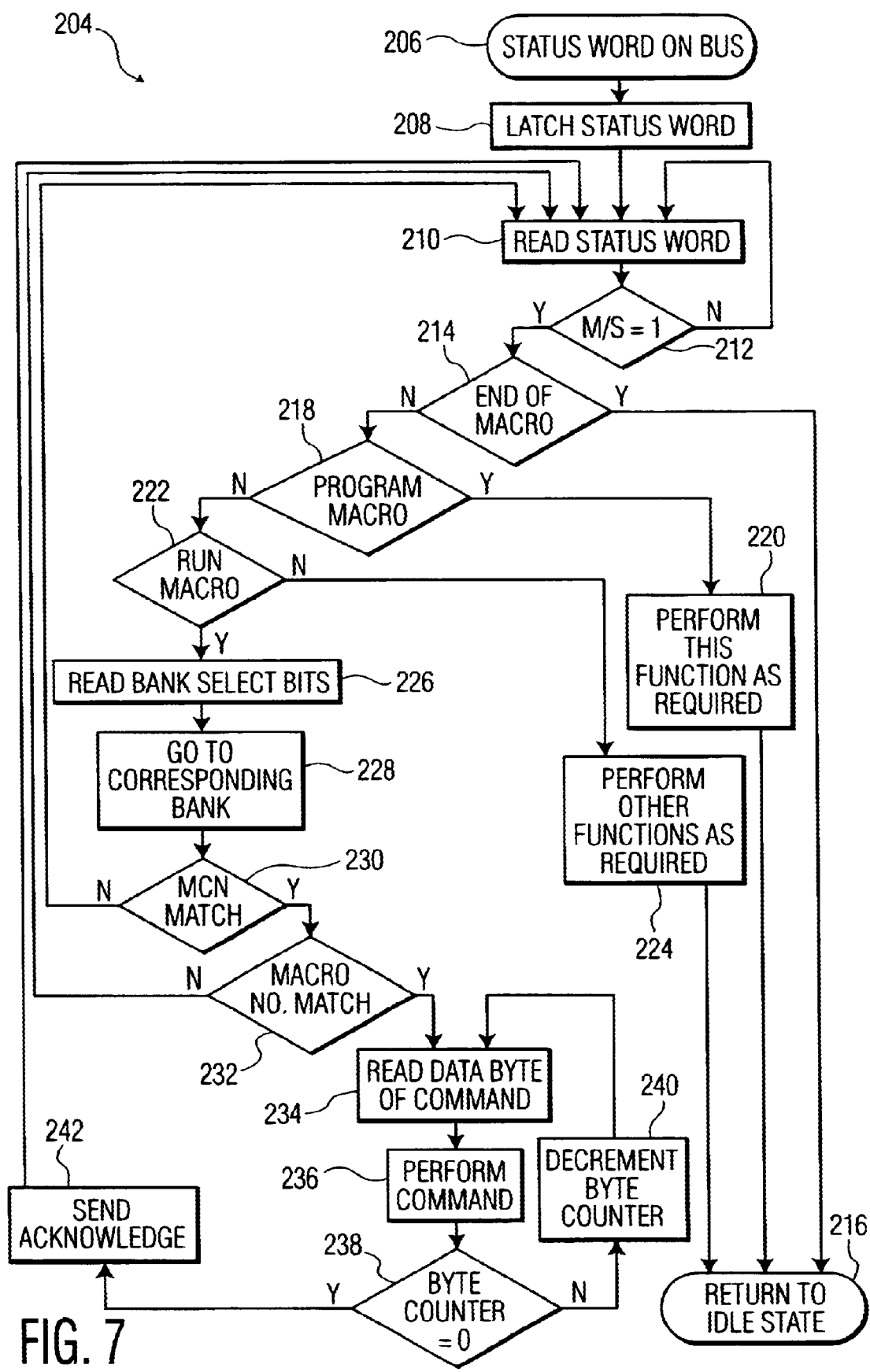
FIG. 7 is a flow chart of the steps performed by a slave A/V device in the macro run mode in accordance with the principles of the present invention.

With reference now to FIG. 7, there is depicted program flow 204 showing the program flow or steps of the slave device during the macro run mode. The slave device determines if there is a status word on the bus 206 and if so latches the status word 208 and reads same 210. If the read status word has a master/slave (M/S) bit not set to logical "1" 212, the program returns to the read status word state 210. When the master/slave (M/S) bit is set to logical "1", the program determines if the status word indicates the end of the macro. When the end of the macro is received, the program returns to the idle state 216.

When the end of the macro is not received as part of the status word, the program determines whether the status word indicates the program macro mode. If so, this function is performed as required 220 and then returns to the idle state 216. When a program mode is not detected, the device determines if the status word indicates to run the macro. If the status word does not indicate to run the macro, other functions are performed as required 224 and then returned to the idle state 216. When the status word indicates to run a macro 222, the bank select bits are read 226 and the appropriate bank in the slave memory is read 228 to determined if there is a macro control number match 230. No match between the macro control number of the status word and the macro control number in the selected slave memory bank returns the device to read the next status word 210. When there is a match between the macro control number of the selected slave memory bank and the macro control number of the status word, the device determines whether there is a macro number match 232. No match again returns the program to read status word 210. A macro number match 232 makes the program read the command data byte 234, perform the command 236, and then read the byte counter 238. If the byte counter at this point is equal to zero (0), the slave device sends an acknowledgement signal on the bus 242 and awaits reading of the next status word 210. When the byte counter is not equal to zero (0), the byte counter is decremented 240. Thereafter, the command data byte is read 234.

Of course, it should be understood that the above program flows are not accomplished mutually exclusive of the other devices or each other, as there is interaction between the master and all slave devices during both the macro program mode and the macro run mode. Depending on what is stored in the slave memory portion of the slave devices, the appropriate slave will acknowledge the status word of the master device. Also, the type of bus utilized in the present invention can be any type of bus, but generally is a slower type of bus. Such a bus may be a SCART type bus or a 1394 type bus.

Figure 9:
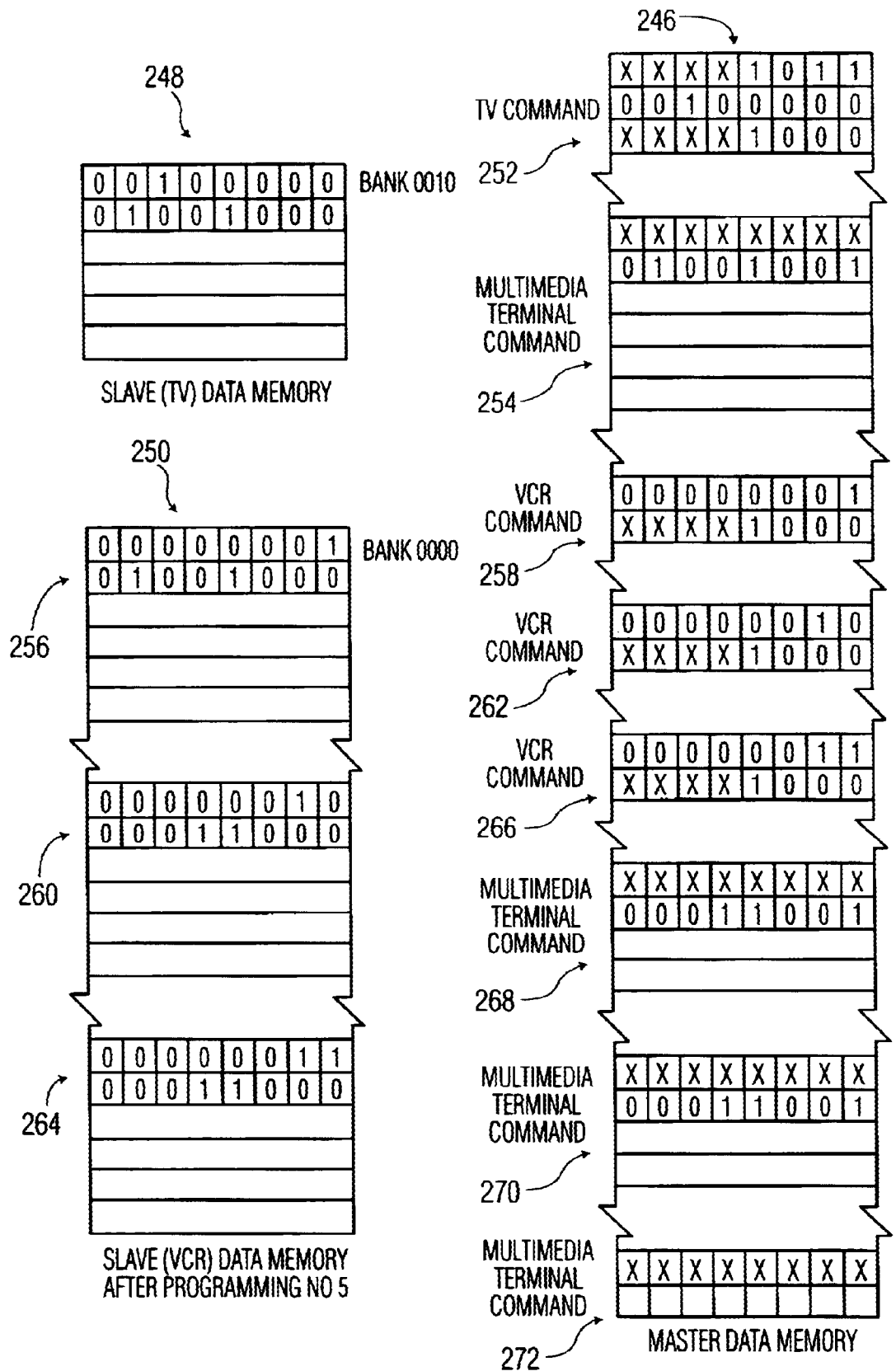
FIG. 9 depicts exemplary contents of the various data memories of the master A/V device and slave A/V devices after exemplary programming in accordance with the principles of the present invention.

With particular reference now to FIG. 9, a specific programming example will be described, utilizing the multimedia system 10 depicted in FIG. 1. FIG. 9 depicts the master data memory portion 246 of multi-media terminal 12 selected as the master device, the slave data memory portion of the slave TV 18, and the slave data memory portion 250 of the slave VCR 16 for the following commands. The TV 18, multi-media terminal 12, and VCR 16 are turned on. Thereafter, a favorite program/channel is selected for the VCR 16 and the multi-media terminal 12. Additionally, the shopping channel is selected for the multi-media terminal 12. Finally, the VCR 16 is set to record. With this command structure, initially the macro key 40 of the multi-media terminal 12 is depressed and held for the appropriate period of time. Then the actions or commands for each device is inputted on the individual device itself. When the last action or command has been inputted, the macro key 40 is depressed again. In view of the foregoing flow charts, the resulting memory structures for the VCR, TV and multi-media terminal are as depicted in FIG. 9. The slave TV memory section 248 contains two (2) lines of bits. The slave VCR memory section 250 contains. three (3) portions 256, 260 and 264 each having two (2) lines of bits. The multi-media terminal master data memory section 246 contains eight (8) portions, 252, 254, 258, 262, 266, 268, 270, and 272 each having two (2) lines of bits.

Figure 11A:
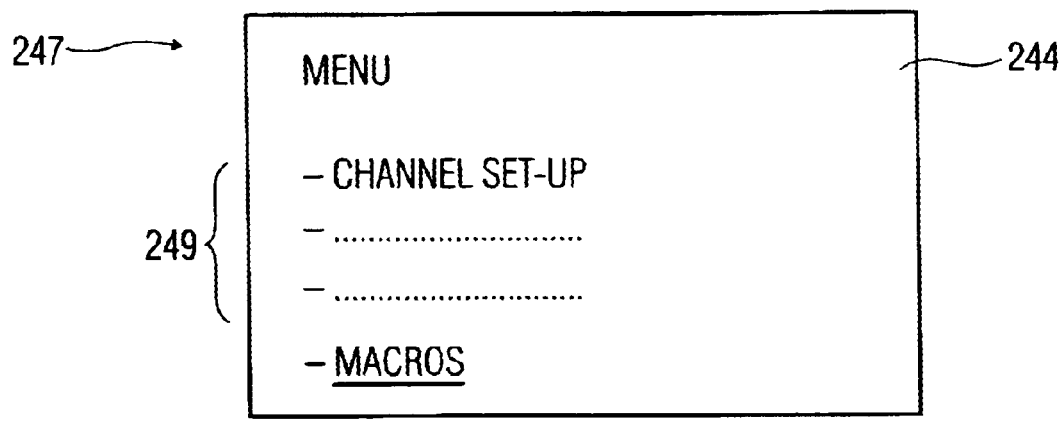
FIGS. 11A, B, and C depict exemplary screen displays for on-screen macro programming.
Figure 11B:
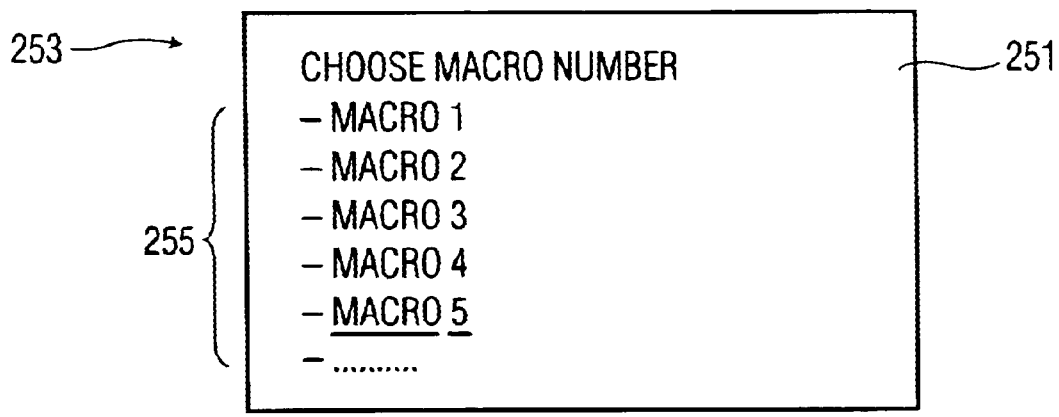
Figure 11C:
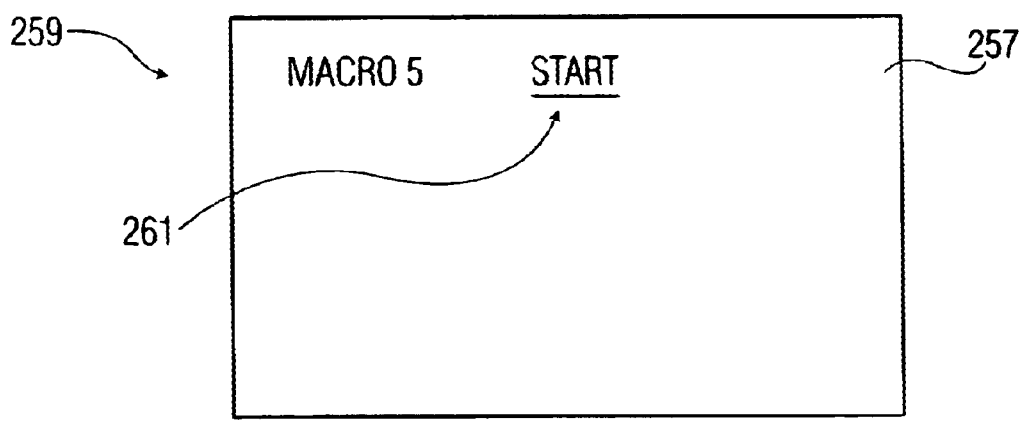

With reference now to FIGS. 11A, 11B, and 11C, there are depicted three exemplary screen displays 244, 251, and 257 respectively, that could be displayed on display device 18 during on-screen macro programming via menus according to an aspect of the present invention. Since most multimedia devices utilize menus and particularly on-screen menus for programming the particular device or to access various functions of the particular device, a macro in accordance with the principles of the present invention can be programmed, edited, and/or invoked via on-screen displays. Generally, device functions are selected/controlled from a remote (see FIG. 1), and such can be used for on-screen programming. Thus, instead of a macro key on a multi-media device as described above, a remote can be used to select on-screen menu choices.

In FIG. 11A exemplary screen display 244 may be a main screen display which is indicated by screen display mode indicator 247, here MENU. Below MENU are various functions/commands/features 249 that may be selected by the user. Such menu selections 249 includes MACROS that upon selection may invoke screen display 251 of FIG. 11B. Screen display 251 again indicates at 253 the display mode, here CHOOSE MACRO NUMBER having various functions/commands/features 255 underneath.

For illustration, screen display 251 may be for programming, editing or running a macro. In this instance when MACRO 5 is selected from screen display 251, screen display 257 of FIG. 11C may be displayed which again may pertain to programming, editing or running the macro. Screen display 257 again includes a screen mode indicator 259, here MACRO 5 to indicate that macro number 5 has been selected. Area 261 displays the currently selected or stored steps of the macro. Of course, FIGS. 11A, 11B, and 11C are only exemplary and aid in the illustration of the principle of use of the present invention with on-screen programming. Further, screen displays 244, 251, and 257 are only three of many possible screen displays as are usual in on-screen menus.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

What is claimed is:

1. In a plurality of multi-media devices, each multi-media device in communication with at least one common multi-media device via a bus and including macro access means, memory and processing in communication with each other and the bus, a method for programming a macro that can control any of the plurality of multi-media devices, the method comprising:
   a) selecting a master multi-media device from one of the plurality of multi-media devices to initiate the macro by activating its macro access means, the master multi-media device generating a macro command number, storing the macro command number in its memory, and sending the macro command number on the bus;
   b) selecting an action related to any one of the plurality of multi-media devices, the multi-media device to which the action is related to storing the macro command number and the action in its memory and generating an acknowledge signal and sending the acknowledge signal on the bus, the master multi-media device receiving the acknowledge signal, storing the acknowledge signal in its memory, generating a further macro command number, storing the further macro command number in its memory, and sending the further macro command on the bus; and c) repeating step "b" until the macro access means of the master multi-media device is reactivated.

2. The method of claim 1, wherein the macro access means comprises on-screen programming.

3. The method of claim 1, wherein step "c" further comprises:
   generating a stop macro command by the master multi-media device, storing the stop macro command in the memory of the master multi-media device, and sending the stop macro command on the bus.

4. The method of claim 3, wherein the master multi-media device further generates a current operating mode-signal and sends the current operating mode signal on the bus with the macro command number.

5. The method of claim 1, wherein the macro command number is part of a status word, the status word including current operating mode, macro number, and device status.

6. The method of claim 5, wherein the status word is two bytes long.

7. A method of controlling a plurality of multi-media devices, each multi-media device having a memory coupled to a processor, a bus interface coupled to the processor, macro access means, the plurality of multi-media devices in common communication with at least one multi-media device of the plurality of multi-media devices via a bus, the method comprising:
   a) selecting a master multi-media device from the plurality of multi-media devices by activating the macro access means of one of the plurality of multi-media devices;
   b) generating at least a portion of a master status word by the master multi-media device, wherein the master status word comprises a macro command number that is associated with an action of a sequence of actions of a macro;
   c) storing the generated master status word in the memory of the master multi-media device;
   d) sending the generated master status word on the bus;
   e) selecting an action on any one of the plurality of multi-media devices wherein the multi-media device on which the action was selected becomes a slave multi-media device;
   f) generating another portion of the master status word by the slave multi-media device on which the action was selected;
   g) storing the master status word with the portion generated by the slave multi-media device on which the action was selected in the memory of the multi-media device on which the action was selected;
   h) sending the master status word with the portion generated by the slave multi-media device on which the action was selected on the bus; and
   i) repeating steps "b" through "h" until the master multi-media device generates a stop macro command and sends the stop macro command on the bus.

8. The method of claim 7, wherein said macro access means comprises on-screen programming.

9. The method of claim 8, wherein the memory of each multi-media device is divided into a master memory section utilized when a multi-media device is a master multi-media device, and a slave memory section utilized when a multi-media device is a slave multi-media device.

10. The method of claim 8, wherein the master status word includes a first byte and a second byte.

11. The method of claim 10, wherein the master multi-media device generates four least significant bits of the first byte of the master status word, and the slave multi-media device on which the action was selected generates four most significant bits of the first byte of the master status word.

12. The method of claim 11, wherein the second byte of the master status word includes bits associated with a macro number used, bits associated with a current operating mode, and an acknowledge bit.

13. The method of claim 12, wherein the acknowledge bit is set to logical "1" when the master multi-media device sends the status word on the bus, and the acknowledge bit is set to logical "0" when the slave multi-media device sends the status word on the bus.

14. The method of claim 8, further comprising the step of storing in the memory of the slave multi-media device on which the action was selected an internal device command associated with the action selected on the slave multi-media device.

15. A method of addressing via a bus a plurality of multi-media devices all in communication with one another via the bus for implementing a macro capable of being invoked from a single multi-media device of the plurality of multi-media devices and controlling a sequence of actions of a plurality of actions associated with any of the plurality of multi-media devices, each multi-media device including a memory, a processor in communication with the memory and the bus, and macro access means including on-screen programming implemented by the processor, the method comprising:

a) generating a master status word by one of the plurality of multi-media devices by activating its macro access means, wherein the master status word comprises a macro command number that is associated with an action of a sequence of actions of a macro;

b) sending the master status word onto the bus by the multi-media device whose macro access means was activated;

c) selecting an action on one of the multi-media devices of the plurality of multi-media devices;

d) storing the master status word in the memory of the action selected multi-media device;

e) storing an internal command associated with the selected action of the multi-media device in the memory of the action selected multi-media device;

f) generating a slave status word by the action selected multi-media device;

g) sending the slave status word onto the bus the action selected multi-media device;

h) receiving the slave status word by the multi-media device whose macro key was activated;

i) generating a further status word by the multi-media device on whose macro access means was activated;

j) sending the further generated status word on the bus; and k) repeating "c" through "j" until the multi-media device whose macro access means was activated generates and sends on the bus a stop macro command, wherein the master status words and the slave status words are the only data sent over the bus.

16. The method of claim 15, wherein the memory of each multi-media device is divided into a master memory section utilized when a multi-media device generates a master status word, and a slave memory section utilized when a multi-media device generates a slave status word.

17. The method of claim 15, wherein the master status word includes a first master word byte and a second master word byte, and the slave status word includes a first slave word byte and a second slave word byte.

18. The method of claim 17, wherein the multi-media device whose macro access means was activated generates four least significant bits of the first master word byte, and the second master word byte comprises bits designating current macro number, bits designating current operating mode, and an acknowledge bit, and the slave status word comprises the master status word with the four most significant bits determined by the action selected multi-media device, and a resetting of the acknowledge bit.

19. The method of claim 18, wherein said macro access means is activated by a remote.

* * * * *